United States Patent [19]

Sprunk et al.

[11] Patent Number: 5,606,616

[45] Date of Patent: Feb. 25, 1997

[54] CRYPTOGRAPHIC APPARATUS WITH DOUBLE FEEDFORWARD HASH FUNCTION

[75] Inventors: Eric Sprunk, Carlsbad; Paul Moroney, Olivenhain; Candace Anderson, Encinitas, all of Calif.

[73] Assignee: General Instrument Corporation of Delaware, Chicago, Ill.

[21] Appl. No.: 497,880

[22] Filed: Jul. 3, 1995

[51] Int. Cl.$^6$ .................. H04L 9/00; H04L 9/06
[52] U.S. Cl. .................. 380/29; 380/25; 380/49; 380/42
[58] Field of Search .................. 380/49, 25, 42, 380/29

[56] References Cited

U.S. PATENT DOCUMENTS

| | | | |
|---|---|---|---|
| 5,005,200 | 4/1991 | Fischer | 380/25 |
| 5,307,409 | 4/1994 | Driscoll | 380/42 |
| 5,432,848 | 7/1995 | Butter et al. | 380/49 |
| 5,544,244 | 8/1996 | Ogura | 380/49 |

OTHER PUBLICATIONS

Bruce Schneier, "Applied Cryptography: Protocols, Algorithms, and Source Code in C," ©1994 John Wiley & Sons, Inc., pp. 339–341 and 447–448.

*Primary Examiner*—Stephen C. Buczinski
*Assistant Examiner*—Carmen White
*Attorney, Agent, or Firm*—Barry R. Lipsitz

[57] ABSTRACT

Apparatus is provided for authenticating information using a double feedforward hash function to provide complementarity in the implementation of an encryption algorithm. A cryptographic processor has a first input for receiving plaintext, a second input for receiving a key and an output for outputting ciphertext generated by cryptographically processing the plaintext and key. A first circuit element is responsive to the ciphertext and plaintext for outputting a first ciphertext derivative. A second circuit element is responsive to at least a portion of the first ciphertext derivative and the key for outputting a second ciphertext derivative. The first and second circuit elements can be XOR gates. Alternatively, these elements can be provided using lookup tables. Subsequent cryptographic processor stages can be provided having a first input for receiving second plaintext, a second input for receiving the second ciphertext derivative as a key, and an output for outputting second ciphertext generated by cryptographically processing the second plaintext and the second ciphertext derivative. In an illustrated embodiment, the cryptographic processor is a DES processor.

20 Claims, 5 Drawing Sheets

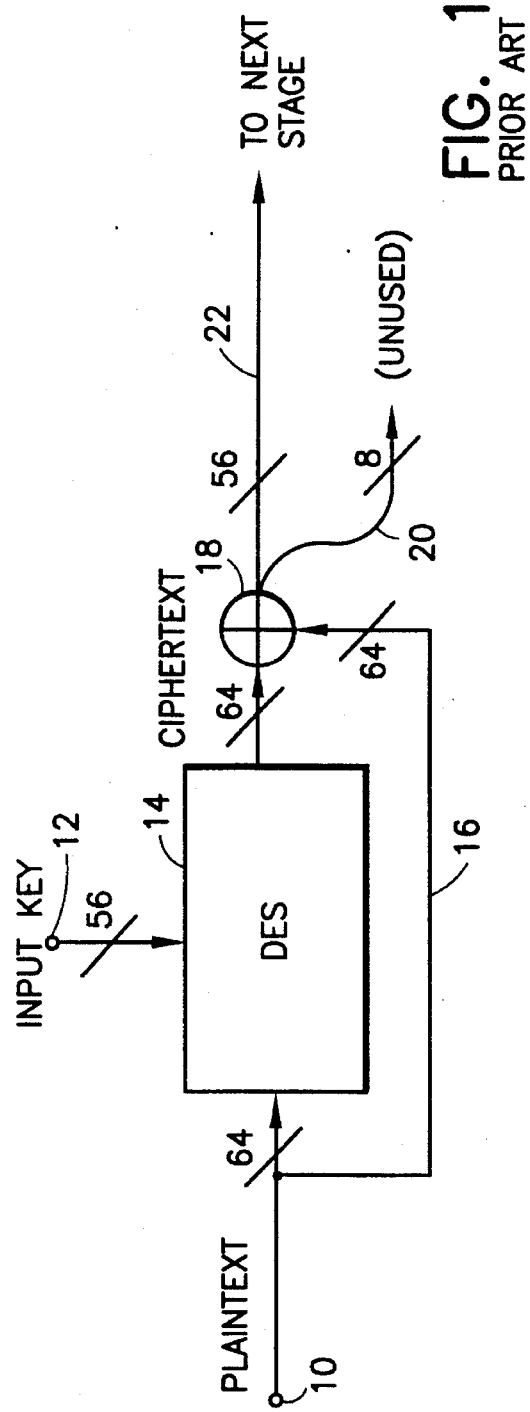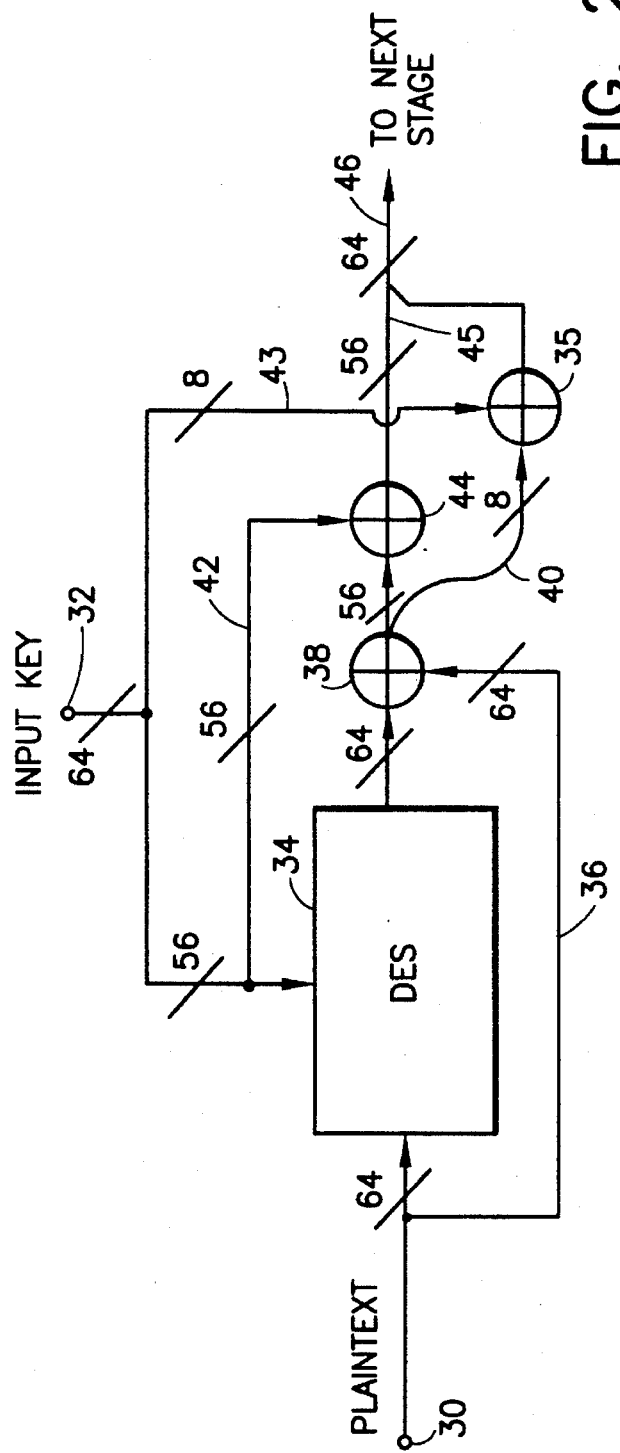

CRYPTOGRAPHIC APPARATUS WITH DOUBLE FEEDFORWARD HASH FUNCTION

BACKGROUND OF THE INVENTION

The present invention relates to cryptographic apparatus, and more particularly to a cryptographic processor using a double feedforward arrangement to implement an encryption algorithm having a complementarity property, such that inversions at the input of the cryptographic processor can be detected at the output thereof.

Cryptographic apparatus is used to transform messages to render them unintelligible to all but the intended receiver of the message. In cable and satellite television systems, for example, encryption is used to prevent theft of services. In computer communications, data encryption is used to render messages unintelligible as well as to provide assurance to the receiver that the message is not a forgery. Encryption can also allow the receiver to prove to a third party that the message is not a forgery. These various functions are referred to as, respectively, communication security, authentication and digital signatures.

The transformation used to encipher a message involves the use of an encryption algorithm and a key. The key information is kept secret. In order to encipher a message, the encryption algorithm is applied to the message and the key is used as an auxiliary input to control the enciphering. The task of deciphering is the reverse operation, and is performed similarly.

Cryptosystems depend upon an amount of key information that is independent of the message length. In theory, these systems are breakable. However, they are usable in practice since the person trying to break the cipher must use an impractical or infeasible amount of computational resources in order to break the cipher. In other words, the "work-factor" necessary to break the cipher is high enough to prevent a successful attack.

An example of a cryptosystem in wide use today is the data encryption standard (DES), which was approved by the U.S. National Bureau of Standards in 1976. The DES algorithm enciphers a sixty-four bit message block under control of a fifty-six bit key to produce a sixty-four bit ciphertext. Details of the DES algorithm can be found in FIPS Publication 46, "Specifications for the Data Encryption Standard," Jan. 15, 1977, and FIPS Publication 74, "Guidelines for Implementing and Using the NBS Data Encryption Standard," Apr. 1, 1981, both available from the U.S. Department of Commerce, National Technical Information Service.

One common use of an encryption algorithm is as part of a "hash function" in which authentication of an input signal is provided by processing (i.e., "hashing") the input signal with a cryptographic key. In a conventional single feedforward hash function (SFFH), inversion of a signal at the input of the function cannot be detected at the output of the function. This is undesirable in many implementations, since security may be compromised if alterations are made to data that is input to the secure processor without some means of detecting that changes have been made. If a party trying to break the security can obtain information as to how the system responds to changes in the input data, without detection by the system, then an opportunity is provided to experiment over a relatively long period of time and potentially succeed in thwarting security.

It would be advantageous to provide apparatus for implementing a hash function that enables the detection, at the output of the hash function, of changes such as data inversions made at the input thereto. Such an implementation would provide the property of complementarity to the hash function.

It would be further advantageous to provide apparatus for providing complementarity in systems using cascaded cryptographic hash functions. Such an apparatus should provide an input key to each successive stage that is produced in such a way that ensures complementarity, thereby enabling inversions at the inputs to the function to be detected at the output thereof.

The present invention provides apparatus having the aforementioned advantages.

SUMMARY OF THE INVENTION

In accordance with the present invention, cryptographic apparatus is provided in which a cryptographic processor has a first input for receiving eight parallel bytes $F_1$–$F_8$ of first input data, a second input for receiving eight parallel bytes $S_1$–$S_8$ of second input data, and an output for outputting eight parallel bytes $C_1$–$C_8$ of ciphertext generated by cryptographically processing the first and second input data. First means are provided for processing the ciphertext and the first input data to produce a first ciphertext derivative comprising eight parallel bytes $FD_1$–$FD_8$. Second means process the first ciphertext derivative and the second input data for outputting a second ciphertext derivative $SD_1$–$SD_8$. The first means exclusively OR's each of the ciphertext bytes $C_1$–$C_8$ with the like numbered first input data byte $F_1$–$F_8$ to produce the first ciphertext derivative. The second means exclusively OR's each of the first ciphertext derivative bytes $FD_1$–$FD_8$ with the like numbered second input data byte $S_1$–$S_8$ to produce the second ciphertext derivative. Instead of using exclusive OR's, nonlinear functions can be provided by the first and second means to produce the first and second ciphertext derivatives, respectively. The nonlinear functions can be of a type that output one half the number of bits as are input thereto.

The first means can comprise a lookup table addressed by the first input data and the ciphertext to output the exclusive OR's of the like numbered bytes thereof. Similarly, the second means can comprise a lookup table addressed by the second input data and the first ciphertext derivative to output the exclusive OR's of the like numbered bytes thereof. Alternatively, the first and second means can comprise conventional logic exclusive OR gates.

A second cryptographic processor stage can be provided. This stage is similar to the first stage, and has a first input for receiving eight parallel bytes of third input data and a second input for receiving the second ciphertext derivative from the preceding stage. The second cryptographic processor also has an output for outputting eight parallel bytes of second ciphertext generated by cryptographically processing the third input data and the second ciphertext derivative. In an illustrated embodiment the cryptographic processors are DES processors.

The present invention also provides cryptographic apparatus in which a cryptographic processor has a first input for receiving eight parallel bytes $F_1$–$F_8$ of input data. A second input is provided for receiving parallel bytes $F_2$–$F_8$ of the first input data as a key. An output is provided for outputting seven parallel bytes $C_1$–$C_7$ of ciphertext generated by cryptographically processing the input data and the key. First means exclusively OR (or apply a nonlinear function to) each of the first seven input data bytes $F_1$–$F_7$ with the succeeding input data byte $F_2$–$F_8$, respectively, to produce seven bytes of feedforward data $FF_1$–$FF_7$. Second means are provided for exclusively OR'ing (or applying a nonlinear function to) each of the feedforward data bytes $FF_1$–$FF_7$ with the like numbered ciphertext byte $C_1$–$C_7$ to produce a ciphertext derivative comprising seven parallel bytes $D_1$–$D_7$.

The first means can comprise a lookup table addressed by the first seven and succeeding input data bytes to output the exclusive OR's thereof. Similarly, the second means can comprise a lookup table addressed by the feedforward data bytes and the like numbered ciphertext bytes to output the exclusive OR's thereof. The exclusive OR functions can alternatively be provided by conventional exclusive OR gates. The cryptographic processor can comprise a DES processor.

BRIEF DESCRIPTION OF THE DRAWINGS

FIG. 1 is a block diagram illustrating a prior art feedforward hash function;

FIG. 2 is a block diagram of the double feedforward hash function of the present invention;

DETAILED DESCRIPTION OF THE PREFERRED EMBODIMENTS

Figure 3A:
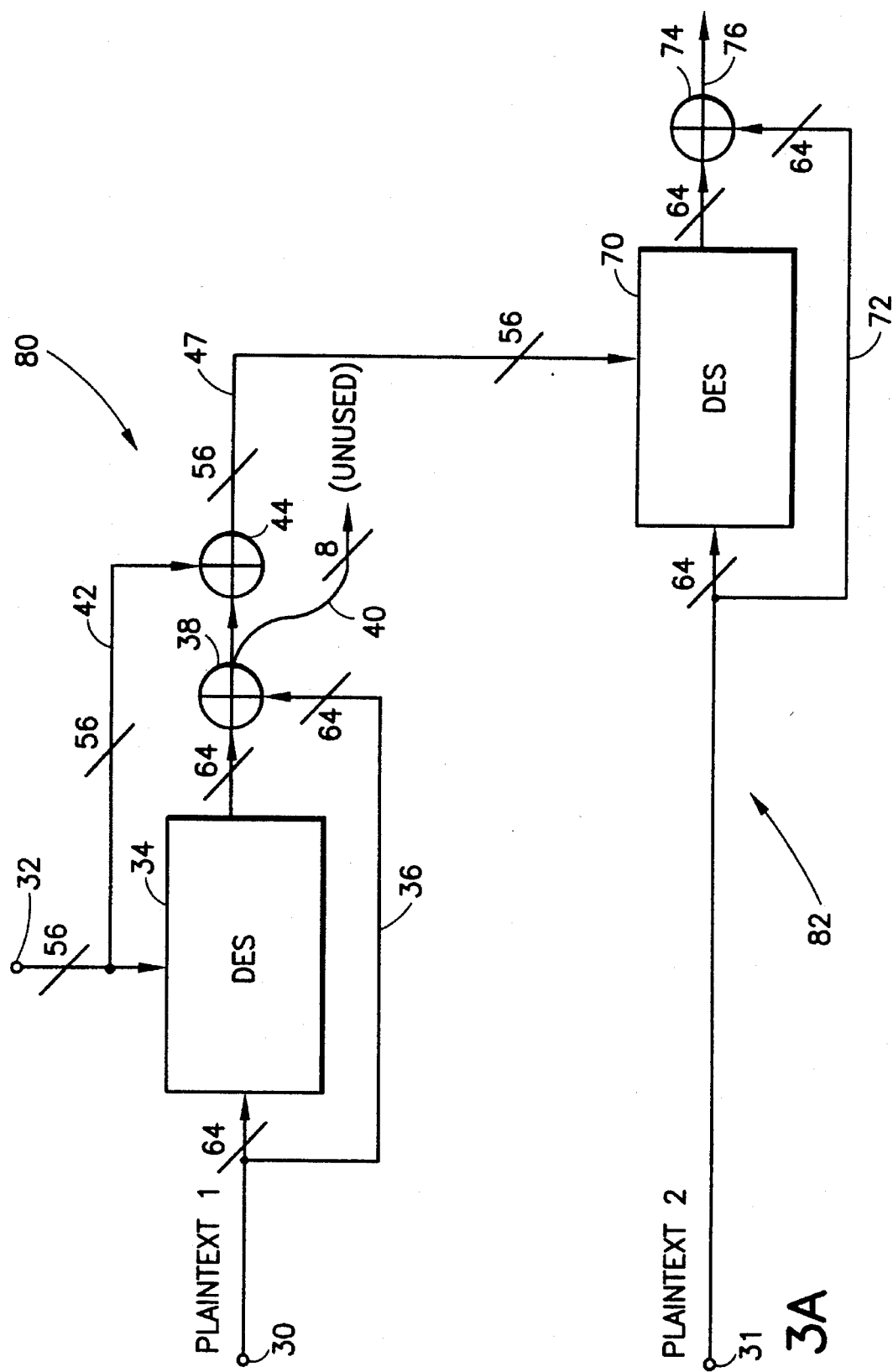
FIG. 3A is a block diagram illustrating the use of the double feedforward hash function in a cascaded implementation with a single feedforward hash function in accordance with the present invention.

Cryptographic processing is used to authenticate information for various applications. One application is in the communication of subscription television services via satellite. Such a system is disclosed in U.S. Pat. No. 4,613,901 to Gilhousen, et al. entitled "Signal Encryption and Distribution System for Controlling Scrambling and Selective Remote Descrambling of Television Signals." In the Gilhousen, et al., system, various cryptographic keys are provided for use in providing an encrypted television signal. Among the keys described are category keys, each common to a different subset of subscriber descramblers, and program keys specific to each different television program to enable authorized subscribers to decrypt a particular program signal.

The processing of the program keys is generally performed in an authenticated fashion to prevent misidentification of a channel. In particular, channel identification information which includes items such as program costs, is sent in an authenticated fashion to prevent its alteration. The authentication can be performed by hashing a "program prekey" with the channel identification information to produce the actual program key used to produce a working key necessary to decrypt a desired program.

A hash function employed by the prior art as part of the encryption or decryption process is known as the "feedforward DES" and is illustrated in FIG. 1. Information to be authenticated ("plaintext") is input via terminal 10 to the DES processor 14. The plaintext is input in eight byte (sixty-four bit) portions to both DES processor 14 and to an exclusive-OR (XOR) gate 18 via line 16. A seven byte (fifty-six bit) encrypted program pre-key is input via terminal 12 to the DES processor 14. The plaintext is processed with the input key according to the DES algorithm to provide eight bytes (sixty-four bits) of ciphertext that is XOR'ed with the plaintext by XOR gate 18. Although XOR gate 18 outputs sixty-four bits, only fifty-six of the bits are output via line 22 as an input key to a successive, cascaded feedforward DES stage. The remaining eight ciphertext bits on line 20 are unused. Thus, one full byte of ciphertext is dropped in each hash stage. Moreover, the hash function of FIG. 1 does not provide the benefits of complementarity. Instead, input inversion (and therefore changes made to the input data) cannot be detected downstream.

The present invention provides a double feedforward hash function with complementarity as illustrated in FIG. 2. Plaintext is introduced via terminal 30 to a DES processor 34 and, via line 36, to an XOR gate 38. The plaintext is processed in eight byte (sixty-four bit) portions. An eight byte (sixty-four bit) input key is provided via terminal 32. Seven bytes of these eight are processed by DES processor 34 and the remaining byte is input to exclusive OR gate 35. The input key is also coupled to an XOR gate 44 via line 42. Gate 44 exclusively OR's fifty six bits of the sixty-four bits output from XOR gate 38 with fifty-six bits of the sixty-four bit input key to provide a fifty-six bit result on line 45. The remaining eight bits of the ciphertext output from XOR gate 38 on line 40 are exclusive OR'ed with the remaining eight bits of the sixty-four bit input key on line 43 in XOR gate 35. The output of XOR gate 35 is combined with the fifty-six bit line 45 to form the sixty-four bit output on line 46.

By feeding additional information forward via lines 42 and 43 to the additional XOR gates 44 and 35, the present invention assures that complementarity is provided, and the disadvantage of prior art implementations is overcome.

XOR gates 35, 38 and 44 can be replaced with lookup tables that provide an XOR function as shown or a suitable nonlinear function. As an example, nonlinear functions in which the outputs are one-half the size of the inputs can be used. These include two bits in (x, y) and one bit out (f) where f=x+xy+y; four bits in (w, x, y, z) and two bits out (f1, f2) where:

f1=w+x+y+z+wx+wy+wz+xy+xz+yz+wxy+wxz+wyz+
  xyz+wxyz and f2=wx+wy+wz+xy+xz+yz+wxy+wxz+
  wyz+xyz; and six bits in (a, b, c, d, e, f) and three bits out
  (x, y, z) where:

x=a+b+c+d+e+f+abc+bcd+cde+def+efa+fab+abcdef, y=abc+def+abd+cef+abcd+bcde+ace+abcef, and z=abcde+abcdf+abcef+abdef+acdef+bcdef.

The lookup tables can be implemented in read only memory (ROM). A lookup table replacing XOR gate 35 would be addressed by eight bits of the "first ciphertext derivative" output from element 38 and eight bits of the sixty-four bit input key on line 43. A lookup table replacing XOR gate 38 would be addressed by the ciphertext output from DES processor 34 and the plaintext carried on line 36. A lookup table replacing XOR gate 44 would be addressed by fifty-six bits of the "first ciphertext derivative" output from element 38 and fifty-six bits of the sixty-four bit input key present on line 42. In response, element 44 would output fifty-six bits of a sixty-four bit "second ciphertext derivative" for input via line 46 to a next hashing stage. The remaining eight bits of the second ciphertext derivative are obtained at the output of function (e.g., XOR) 35.

FIG. 3A illustrates the cascading of two DES hash functions in accordance with the present invention. The first stage generally designated 80 is similar to the double feedforward DES hash function stage illustrated in FIG. 2, with a first sixty-four bit input (PLAINTEXT 1) at terminal 30 but only a fifty-six bit second input at terminal 32'. The fifty-six bit "second ciphertext derivative" output on line 47 is used as the input key to a second hash function stage generally designated 82. This stage includes a DES processor 70 that receives a second sixty-four bit plaintext input (PLAINTEXT 2) via terminal 31. The PLAINTEXT 2 input is fed forward via line 72 to an XOR or a nonlinear function 74 where it is processed with the ciphertext output from DES processor 70. The resultant sixty-four bit output from line 76 comprises the authenticated information corresponding to the original plaintext inputs. Although only two hash function stages are illustrated in FIG. 3A (i.e., a double feedforward structure followed by a single feedforward structure), it should be appreciated that any number of stages can be provided in accordance with the present invention, with each stage prior to the final stage comprising a double feedforward structure.

Figure 3B:
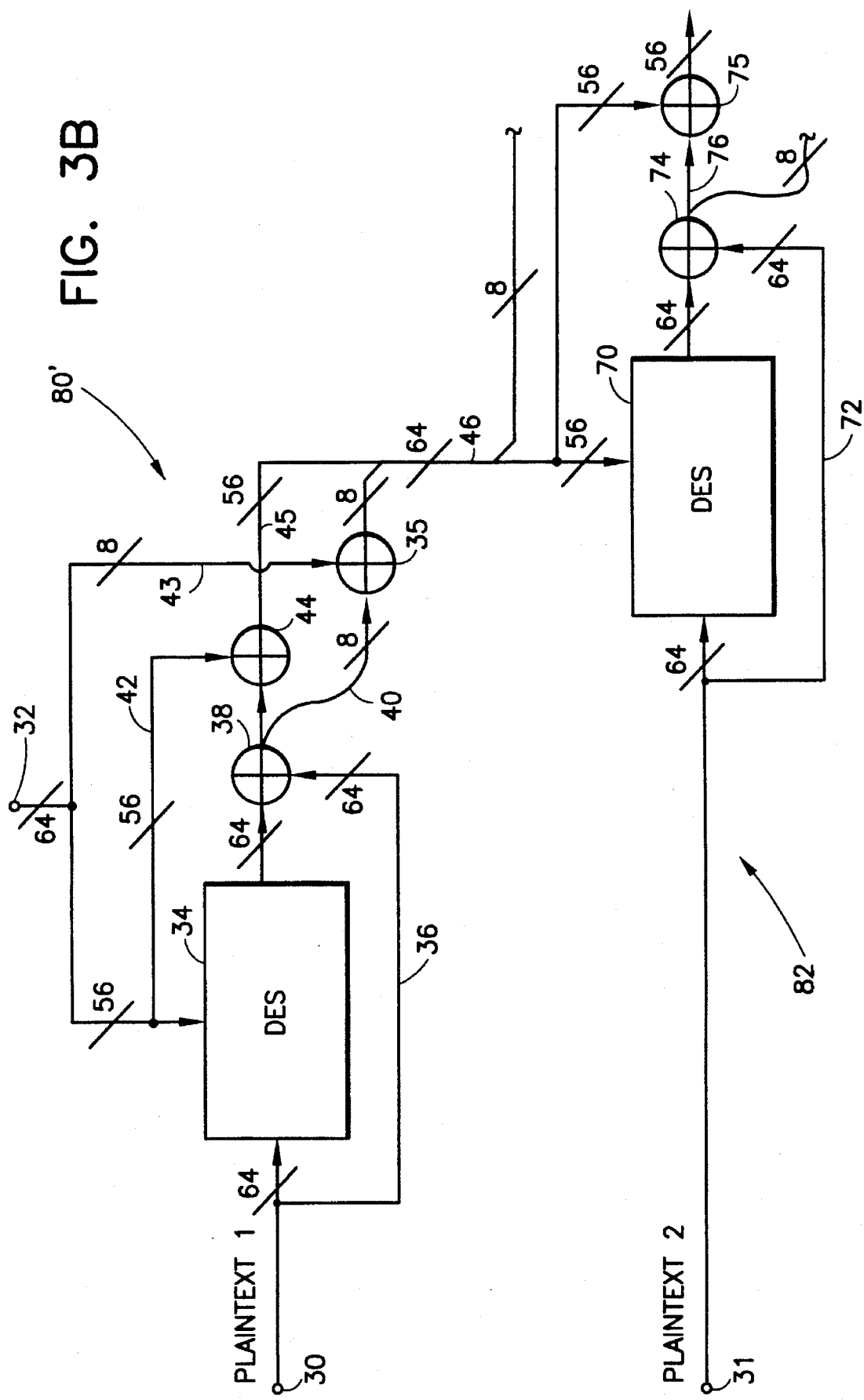
FIG. 3B is a block diagram illustrating the use of the double feedforward hash function in a cascaded implementation with another double feedforward hash function in accordance with the present invention.

FIG. 3B illustrates the cascading of two DES hash functions in accordance with the present invention in which the first stage generally designated 80' is identical to the double feedforward DES hash function stage illustrated in FIG. 2, with a first sixty-four bit input (PLAINTEXT 1) at terminal 30 and a sixty-four bit second input at terminal 32. The fifty-six bit "second ciphertext derivative" output on line 45 is combined with the eight bit output from XOR or nonlinear function 35 to form a sixty-four bit key on line 46 for input to the second hash function stage generally designated 82. This stage includes a DES processor 70 that receives a second sixty-four bit plaintext input (PLAINTEXT 2) via terminal 31. The PLAINTEXT 2 input is fed forward via line 72 to an XOR or nonlinear function 74 where it is processed with the ciphertext output from DES processor 70. The resultant sixty-four bit output from line 76 comprises the authenticated information corresponding to the original plaintext inputs, fifty-six bits of which are input to an XOR or nonlinear function 75 to produce fifty-six bits of the sixty-four bit input to a succeeding stage. As with the embodiment of FIG. 3A, any number of stages can be provided, with each stage prior to the final stage comprising a double feedforward structure as illustrated in FIG. 2.

Figure 4:
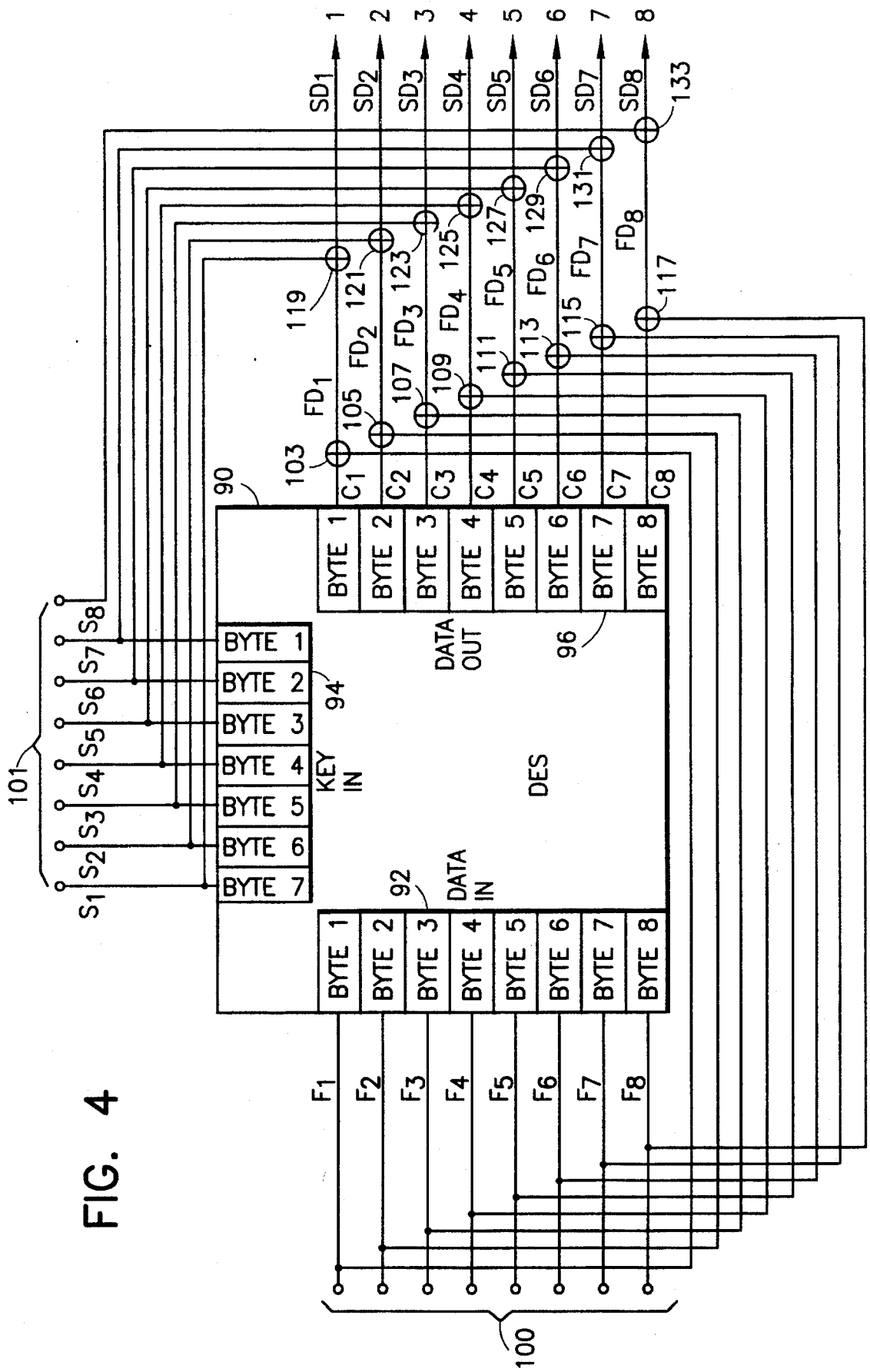
FIG. 4 is a schematic diagram illustrating the specific connections implementing a double feedforward hash function in accordance with the present invention.

FIG. 4 is a schematic representation of a first implementation of the present invention. A DES processor 90 receives eight bytes of input data 92 (each byte containing eight bits) and a cryptographic key 94, to output eight bytes of encrypted data 96. The input data is provided as eight parallel bytes $F_1$–$F_8$ via input terminals 100. Second input terminals 101 receive eight parallel bytes $S_1$–$S_8$ of second input data, the first seven bytes of which ($S_1$–$S_7$) are used as a cryptographic key. The DES processor 90 processes the input data 92 and key 94 to provide output data 96, which comprises eight parallel bytes $C_1$–$C_8$ of ciphertext.

The ciphertext is exclusive ORed to produce a first ciphertext derivative comprising eight parallel bytes $FD_1$–$FD_8$. More particularly, each of the ciphertext bytes $C_1$–$C_8$ is exclusive ORed with the like numbered first input data bytes $F_1$–$F_8$ to produce the first ciphertext derivative. Thus, ciphertext byte $C_1$ is exclusive ORed with input data byte $F_1$ in exclusive OR gate 103 to produce the first ciphertext derivative byte $FD_1$. Ciphertext byte $C_2$ is exclusive ORed with input byte $F_2$ via exclusive OR gate 105 to produce first ciphertext derivative $FD_2$. The same pattern continues all the way through to the exclusive OR'ing of ciphertext byte $C_8$ and input data byte $F_8$ via exclusive OR gate 117.

The first ciphertext derivative and second input data are processed to output a second ciphertext derivative comprising eight parallel bytes $SD_1$–$SD_8$. More particularly, each of the first ciphertext derivative bytes $FD_1$–$FD_8$ is exclusive ORed with the like numbered second input data byte $S_1$–$S_8$ to produce the second ciphertext derivative. Thus, first ciphertext derivative $FD_1$ is exclusive ORed with second input data byte $S_1$ via exclusive OR gate 119 to produce the second ciphertext derivative $SD_1$. First ciphertext derivative $FD_2$ is exclusive ORed with the second input data byte $S_2$ via exclusive OR gate 121 to produce second ciphertext derivative $SD_2$. The process continues in the same manner to the point of which first ciphertext derivative $FD_8$, is exclusive ORed with the second input data byte $S_8$ (via exclusive OR gate 133) to produce second ciphertext derivative $SD_8$.

Figure 5:
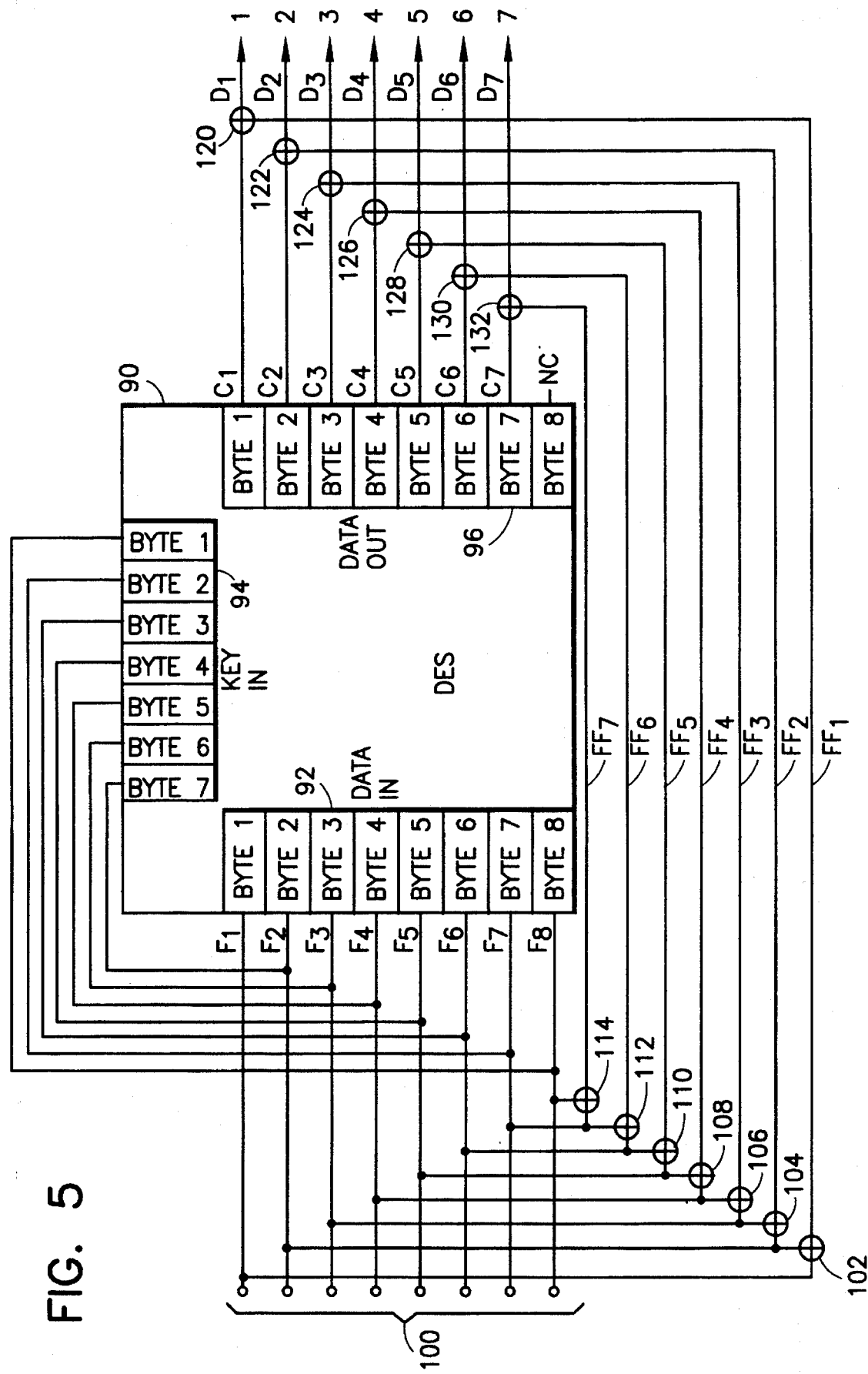
FIG. 5 is a schematic diagram illustrating the specific connections for another example of a double feedforward hash function in accordance with the invention.

FIG. 5 illustrates an embodiment wherein the seven byte key 94 input to DES processor 90 is provided by bytes $F_2$–$F_8$ of the input data 92. In addition, only the first seven bytes of the output data 96 are used.

In accordance with the embodiment of FIG. 5, each of the first seven input data bytes $F_1$–$F_7$ is exclusive ORed with the succeeding input data byte $F_2$–$F_8$, respectively, to produce seven bytes of feedforward data $FF_1$–$FF_7$. Thus, input data byte $F_1$ is exclusive ORed with input data byte $F_2$ in exclusive OR gate 102 to produce feedforward data $FF_1$. Similarly, input data byte $F_2$ is exclusive ORed with input data byte $F_3$ in exclusive OR gate 104 to produce feedforward data $FF_2$. The same process continues through the remaining exclusive OR gates 106, 108, 110, 112 and 114 to produce the remaining feedforward data.

Each of the feedforward data bytes $FF_{12}$–$FF_7$ is exclusive ORed with the like numbered ciphertext byte $C_1$–$C_7$ to produce a ciphertext derivative comprising seven parallel bytes $D_1$–$D_7$. Thus, for example, feedforward byte $FF_1$ is exclusive ORed with ciphertext byte $C_1$ in exclusive OR gate 120 to produce ciphertext derivative byte $D_1$. The remaining data output bytes are exclusive ORed with the remaining feedforward data bytes in exclusive OR gates 122, 124, 126, 128, 130 and 132, respectively in order to produce the remaining ciphertext derivative bytes $D_2$–$D_7$.

It is noted that the exclusive OR gates in each of FIGS. 4 and 5 can be replaced with lookup tables which are addressed by the respective inputs in order to provide the exclusive OR thereof.

It should now be appreciated that the present invention provides cryptographic apparatus which overcomes a potential security problem that can result from prior art security schemes not having the property of complementarity.

Although the invention has been described in connection with various illustrated embodiments, those skilled in the art will appreciate that numerous adaptations and modifications may be made thereto without departing from the spirit and scope of the invention as set forth in the claims.

What is claimed is:

1. Cryptographic apparatus comprising:
   a cryptographic processor having a first input for receiving eight parallel bytes $F_1$–$F_8$ of first input data, a second input for receiving eight parallel bytes $S_1$–$S_8$ of second input data, and an output for outputting eight parallel bytes $C_1$–$C_8$ of ciphertext generated by cryptographically processing said first and second input data;

first means for processing said ciphertext and said first input data to produce a first ciphertext derivative comprising eight parallel bytes $FD_1$–$FD_8$; and second means for processing said first ciphertext derivative and said second input data for outputting a second ciphertext derivative comprising eight parallel bytes $SD_1$–$SD_8$;

wherein:

said first means logically processes each of said ciphertext bytes $C_1$–$C_8$ with the like numbered first input data byte $F_1$–$F_8$ to produce said first ciphertext derivative; and said second means logically processes each of said first ciphertext derivative bytes $FD_1$–$FD_8$ with the like numbered second input data byte $S_1$–$S_8$ to produce said second ciphertext derivative.

2. Cryptographic apparatus in accordance with claim 1 wherein:

said first means comprise a nonlinear function for logically processing each of said ciphertext bytes $C_1$–$C_8$ with the like numbered first input data byte $F_1$–$F_8$ to produce said first ciphertext derivative; and said second means comprise a nonlinear function for logically processing each of said first ciphertext derivative bytes $FD_1$–$FD_8$ with the like numbered second input data byte $S_1$–$S_8$ to produce said second ciphertext derivative.

3. Cryptographic apparatus in accordance with claim 2 wherein said nonlinear functions output one half the number of bits as are input thereto.

4. Cryptographic apparatus in accordance with claim 1 wherein said first means exclusively OR's each of said ciphertext bytes $C_1$–$C_8$ with the like numbered first input data byte $F_1$–$F_8$ to produce said first ciphertext derivative; and said second means exclusively OR's each of said first ciphertext derivative bytes $FD_1 FD_8$ with the like numbered second input data byte $S_1$–$S_8$ to produce said second ciphertext derivative.

5. Cryptographic apparatus in accordance with claim 4 wherein said first means comprise a lookup table addressed by said first input data and said ciphertext to output the exclusive OR's of the like numbered bytes thereof.

6. Cryptographic apparatus in accordance with claim 5 wherein said second means comprise a lookup table addressed by said second input data and said first ciphertext derivative to output the exclusive OR's of the like numbered bytes thereof.

7. Cryptographic apparatus in accordance with claim 4 wherein said second means comprise a lookup table addressed by said second input data and said first ciphertext derivative to output the exclusive OR's of the like numbered bytes thereof.

8. Cryptographic apparatus in accordance with claim 1 further comprising:

a second cryptographic processor stage having a first input for receiving eight parallel bytes of third input data, a second input for receiving said second ciphertext derivative, and an output for outputting eight parallel bytes of second ciphertext generated by cryptographically processing said third input data and said second ciphertext derivative.

9. Cryptographic apparatus in accordance with claim 8 wherein said cryptographic processors are DES processors.

10. Cryptographic apparatus in accordance with claim 1 wherein said cryptographic processor is a DES processor.

11. Cryptographic apparatus in accordance with claim 2 further comprising lookup tables for implementing the nonlinear functions of said first and second means.

12. Cryptographic apparatus comprising:

a cryptographic processor having a first input for receiving eight parallel bytes $F_1$–$F_8$ of input data, a second input for receiving parallel bytes $F_2$–$F_8$ of said first input data as a key, and an output for outputting seven parallel bytes $C_1$–$C_7$ of ciphertext generated by cryptographically processing said input data and said key;

first means for logically processing each of the first seven input data bytes $F_1$–$F_7$ with the succeeding input data byte $F_2$–$F_8$, respectively, to produce seven bytes of feedforward data $FF_1$–$FF_7$; and second means for logically processing each of said feedforward data bytes $FF_1$–$FF_7$ with the like numbered ciphertext byte $C_1$–$C_7$ to produce a ciphertext derivative comprising seven parallel bytes $D_1$–$D_7$.

13. Cryptographic apparatus in accordance with claim 12 wherein:

said first means comprise a nonlinear function for logically processing each of the first seven input data bytes $F_1$–$F_7$ with the succeeding input data byte $F_2$–$F_8$, respectively, to produce said seven bytes of feedforward data $FF_1$–$FF_7$; and said second means comprise a nonlinear function for logically processing each of said feedforward data bytes $FF_1$–$FF_7$ with the like numbered ciphertext byte $C_1$–$C_7$ to produce said ciphertext derivative comprising said seven parallel bytes $D_1$–$D_7$.

14. Cryptographic apparatus in accordance with claim 13 wherein said nonlinear functions output one half the number of bits as are input thereto.

15. Cryptographic apparatus in accordance with claim 12 wherein:

said first means exclusively OR's each of the first seven input data bytes $F_1$–$F_7$ with the succeeding input data byte $F_2$–$F_8$, respectively, to produce said seven bytes of feedforward data $FF_1$–$FF_7$; and said second means exclusively OR's each of said feedforward data bytes $FF_1$–$FF_7$ with the like numbered ciphertext byte $C_1$–$C_7$ to produce said ciphertext derivative comprising said seven parallel bytes $D_1$–$D_7$.

16. Cryptographic apparatus in accordance with claim 15 wherein said first means comprise a lookup table addressed by said first seven and succeeding input data bytes to output the exclusive OR's thereof.

17. Cryptographic apparatus in accordance with claim 16 wherein said second means comprise a lookup table addressed by said feedforward data bytes and the like numbered ciphertext bytes to output the exclusive OR's thereof.

18. Cryptographic apparatus in accordance with claim 15 wherein said second means comprise a lookup table addressed by said feedforward data bytes and the like numbered ciphertext bytes to output the exclusive OR's thereof.

19. Cryptographic apparatus in accordance with claim 12 wherein said cryptographic processor is a DES processor.

20. Cryptographic apparatus in accordance with claim 13 further comprising lookup tables for implementing the nonlinear functions of said first and second means.

* * * * *